United States Patent [19]

Courtemanche et al.

[11] Patent Number: 5,722,745
[45] Date of Patent: Mar. 3, 1998

[54] TRACK-BELT FOR TRACK DRIVEN VEHICLES

[75] Inventors: Denis Courtemanche, Richmond; Mario Bouchard, Sherbrooke, both of Canada

[73] Assignee: Centre de Recherches Camoplast Inc., Sherbrooke, Canada

[21] Appl. No.: 395,708

[22] Filed: Feb. 28, 1995

[30] Foreign Application Priority Data

Sep. 23, 1994 [CA] Canada ................... 2132807

[51] Int. Cl.$^6$ ................................................. B62D 55/24
[52] U.S. Cl. ............................................. 305/168; 305/165
[58] Field of Search ................................. 305/157, 165, 305/167, 168, 169, 178, 179, 181

[56] References Cited

U.S. PATENT DOCUMENTS

| | | | |
|---|---|---|---|
| 2,343,533 | 3/1944 | Burnham | 308/5 |
| 3,550,968 | 12/1970 | Rymes | 305/54 |
| 3,722,961 | 3/1973 | Haley et al. | 305/25 |
| 3,773,126 | 11/1973 | Irvine | 305/168 X |
| 3,774,979 | 11/1973 | Harris | 305/24 |
| 3,781,067 | 12/1973 | Dodson et al. | 305/169 X |
| 3,799,626 | 3/1974 | Kilbane, Jr. | 305/35 |
| 3,887,243 | 6/1975 | Chaumont | 305/24 |
| 4,023,865 | 5/1977 | Morissette | 305/35 |
| 4,217,006 | 8/1980 | Dehnert | 305/35 |
| 4,279,449 | 7/1981 | Martin et al. | 305/35 |
| 4,474,414 | 10/1984 | Tokue | 305/35 |
| 4,795,221 | 1/1989 | Simmons | 305/35 |
| 4,974,970 | 12/1990 | Sugita et al. | 384/12 |
| 4,991,911 | 2/1991 | Blais | 305/24 |
| 5,267,796 | 12/1993 | Nonaka et al. | 384/8 |
| 5,415,470 | 5/1995 | Courtemanche | 305/168 |

FOREIGN PATENT DOCUMENTS 143457  8/1980  Germany.

*Primary Examiner*—Russell D. Stormer
*Attorney, Agent, or Firm*—Darby & Darby

[57] ABSTRACT

The invention relates to an improvement in an endless track belt of the type comprising, a body made of an elastomeric material, an outer surface for contact with the ground and an inner surface provided with lugs or openings for engagement with driving system and at least one endless pathway having a sliding surface contacting a corresponding slide rail of a slide rail suspension. This pathway is devoid of lugs or openings for engagement with driving system. The endless sliding surface is provided with a plurality of slide clips that are spaced apart from each other by a segment of the endless sliding surface. This segment is divided in at least a first and a second distinct part. The first part is made of elastomeric material and the second part defines at least one cavity through the body. The improvement is characterized in that the cavity through the body is to allow the introduction of snow between the slide rail and the first part and in that the first part is of such size that friction with the slide rail will generate heat in a sufficient amount to melt the snow and maintain a lubricating film of water therebetween. Such track belts are of a reduced weight but as efficient as common track belts.

15 Claims, 3 Drawing Sheets

TRACK-BELT FOR TRACK DRIVEN VEHICLES

BACKGROUND OF THE INVENTION

1. Field of the Invention

The present invention relates to a track belt for track-driven vehicles such as snowmobiles. More particularly, the invention relates to a track belt of reduced weight but as efficient as common track belts.

2. Description of the Prior Art

Track belts provided on motor driven vehicles such as snowmobiles, usually comprise a body made of elastomeric materials. This body has a outer surface which contacts the ground and an inner surface which cooperates with a slide suspension system and a driving system. Generally the body is driven by one of several driving wheels such as sprocket wheels which engage driving lugs or openings provided on the inner surface of the track belt. The slide suspension system is designed for supporting the chassis of the vehicle and usually comprises a pair of parallel slide rails contacting the inner surface of the track belt. Such rails also support the track belt with respect to lateral movements.

Formerly, each slide rail of a slide suspension system was aligned with a corresponding row of openings designed for engagement with teeth of a corresponding sprocket wheel. Such a positioning of the slide rails reduce the portion of the inner surface of the track belt in contact with said slide rails and thus the amount of frictions therebetween. It was found that ever though the frictions were reduced, they were still involving failures and rapid wear of the track belt and slide rails. To overcome this drawback, in U.S. Pat. No. 3,887,243 (Chaumont) the portions of the inner surface contacting the slide rails are provided with metal clips. These clips are provided to reduce frictions occurring between the inner surface of the body and the slide rails.

Also, with track belt of the type provided with driving lugs on the inner surface, it is known to minimize frictions between the inner surface of the track belt and the slide rails and also to make easier the positioning of the clips, by positioning said slide rails above a corresponding pathway of clips essentially separated from each other by a hole. (See U.S. Pat. Nos. 3,722,961 (Haley et al.), 4,217,006 (Dehnert), 4,474,414 (Tokue) and 4,023,865 (Morissette)).

It is also well known to improve the strength of the track belt with reinforcing rods embedded in the elastomeric material of the track. Usually these rods are uniformly distributed along the length of the track belt and perpendicular to the endless pathway of the track. It has also been found advantageous to mount clips on a corresponding reinforcing rod. Such an embodiment is disclosed in the U.S. Pat. Nos. 3,887,243, 4,474,414 and 4,911,911.

In U.S. Pat. No. 4,911,911 there is disclosed a track belt provided with two rows of an improved clip. Said clips of a same row are uniformly distributed along the length of the track and spaced apart by two openings designed to be engaged by a tooth of a sprocket wheel. The openings are spaced apart from each other by a short portion of elastomeric material. This portion has obviously a surface in contact with a corresponding slide rail equivalent to that of a clip. The only apparent reason why there is a portion of the inner surface between two neighboring openings is concerned with the engagement of said openning by a tooth of sprocket wheels. In this regard, it is to be noted that for a man skilled in the art, the water which may eventually appear between the inner surface of the track belt and the slide rails will be removed, especially dried under the action of the sprocket wheels.

Therefore, the prior art teaches to the man skilled in the art that slide rails must contact a maximum of frictionless clips and a minimum of the inner surface of the track belt (preferably avoid direct contact with the inner surface of the track belt). It is also known in the art that to maintain a sufficient sturdiness of the track belt, it is advantageous to have a maximum amount of clips. However, this increases the weight of the track belt. Therefore, there is a strong need for a track belt that does not have the drawback of those of the prior art with respect to frictions existing between the inner surface of the track belt and slide rails while reducing the whole weight of said track belt.

SUMMARY OF THE INVENTION

An object of the invention is to embody a track belt for motor vehicles such as snowmobiles having to cooperate with slide rails of a slide suspension system, and which shows at once high characteristics of strength, resistance and durability, avoid frictions between its inner surface and the slide rails and has a reduced weight with respect to track belts already known in the art.

Another object of the present invention is to allow the formation of a lubricating film of water between the slide rails and the inner surface of the track belt and the clips of said track belt, said water consisting of melted snow.

Another object of the invention is a method for minimizing frictions between the slide rails and the corresponding inner surface and clips of the track belt.

It should be noted that in track belts already known in the art, it is always suggested to avoid or at least minimize the contact of the direct elastomeric material with the slide rail. Advantageously, slide rails only contact frictionless surfaces of clips.

However, contrary to the teaching of the prior art, the Applicant has surprisingly found that it was possible to have substantial portion of the inner surface in contact with slide rails, if friction existing between them only allow to generate and maintain a film of water melted snow therebetween as lubricant. More particularly, the Applicant has discovered an improvement in an endless track belt of the type comprising, a body made of an elastomeric material, an outer surface for contact with the ground and an inner surface provided with means for engagement with driving means. The inner surface is also provided with at least one endless pathway having a sliding surface contacting a corresponding slide rail of a slide rail suspension. This pathway is devoid from means for engagment with driving means. The endless sliding surface is provided with a plurality of slide clips that are spaced apart from each other by a segment of the endless sliding surface. This segment is divided in at least a first and a second distinct part. The first part is made of elastomeric material and the second part defines at least one cavity trough the body. Preferably, the opening is upstream of the running of the running direction of the first part of the segment of the sliding surface provided between two neighboring clips. This position of the opening optimizes the introduction of snow against the slide rail to melt said snow and form a film of water on said part and between said rail and first parts. Preferably, the first part of the segment represents the greater portion of said segment. The improvement is characterized in that the cavity through the body is to allow the introduction of snow between the slide rail and the first part and in that the first parts is of such size that friction with the slide rail will generate a sufficient amount of heat to melt the snow and maintain a lubricating film of water therebetween. This characteristic allows the generation of a sufficient heat to melt the snow and create a lubricating film of water.

Preferably, the inner surface of the track belt according to the invention is conventionally provided with two endless pathways, each having a sliding surface and contacting a corresponding slide rail of the slide rail suspension.

The means for engagement with said driving means may be holes. However, they are preferably driving lugs.

Preferably, means for engagement with driving means are positioned vis-à-vis a corresponding reinforcing member and slide clips may also be mounted on a corresponding portion of the body provided with a reinforcing member.

In such cases and according to a preferred embodiment of the invention, the slide clips are provided within the frequency of one slide clip every three means for engagement with driving means or every three reinforcing members (i.e. two reinforcing members between such neighboring members provided with a clip).

According to another particularly preferred embodiment of the invention the segment which is extended between two consecutive clips is divided in a first, a second and a third distinct part. The first part is made of elastomeric material and each of the second and the third parts defines one cavity. Each of said cavities is provided closely adjacent to an associated slide clip. The invention also relates to a method for lubricating surfaces between a slide rail of a slide suspension system and a corresponding part of each segment of the inner surface of an endless track belt for vehicles moving on snow surfaces. Said track belt comprises a body made of an elastomeric material, an outer surface for contact with the ground and an inner surface provided with means for engagement with driving means and at least one endless pathway having a sliding surface contacting a corresponding slide rail of a slide rail suspension. The endless sliding surface of the track belt is provided with a plurality of slide clips that are spaced apart from each other by a segment of the endless sliding surface. The segment is divided in at least a first and a second distinct part, the first part being made of elastomeric material and the second part defining at least one cavity through the body. In such track-belt the first part represents the greater portion of the segment. The method according to the invention is characterized in that, while the track belt is running, there is snow introduced through cavities and contacting the slide rails against which it melts to define a film of water and then builds a lubricating film of water between the slide rail and the first part of the rail. It is understood that frictions between the slide rail and the first part of the segments generate a sufficient amount of heat to melt said snow and maintain the presence of the film of water between the slide rail and first parts.

BRIEF DESCRIPTION OF THE DRAWINGS

The present invention will be better understood with reference to the non restrictive description of a particularly preferred embodiment of the invention, made with reference to the following drawings.

DESCRIPTION OF THE PREFERRED EMBODIMENT

Figure 1:
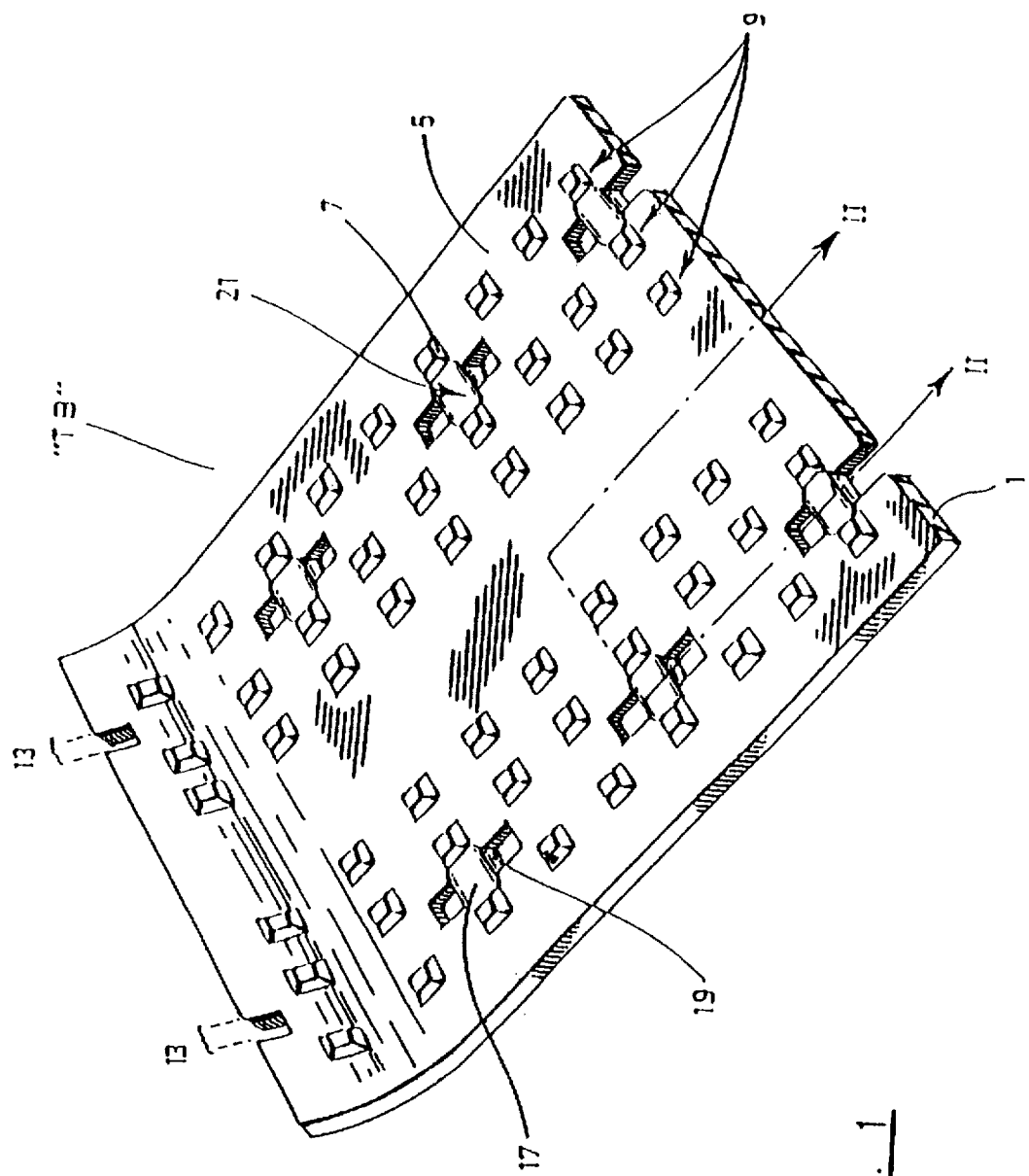
FIG. 1 is a perspective view of a track belt according to a preferred embodiment of the invention.
Figure 2:
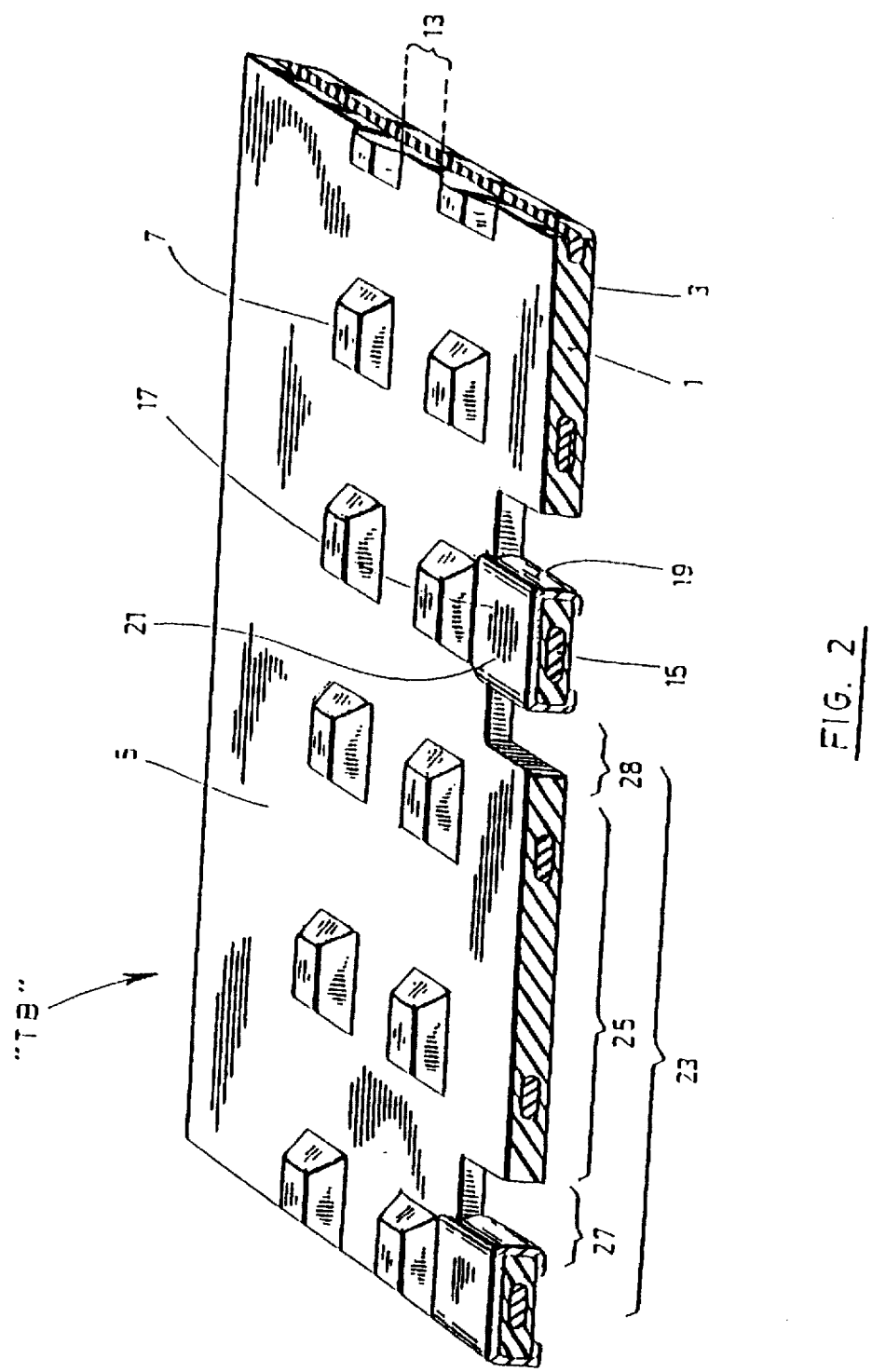
FIG. 2 is an enlarged fragmentary sectional view according to line II—II in FIG. 1.
Figure 3:
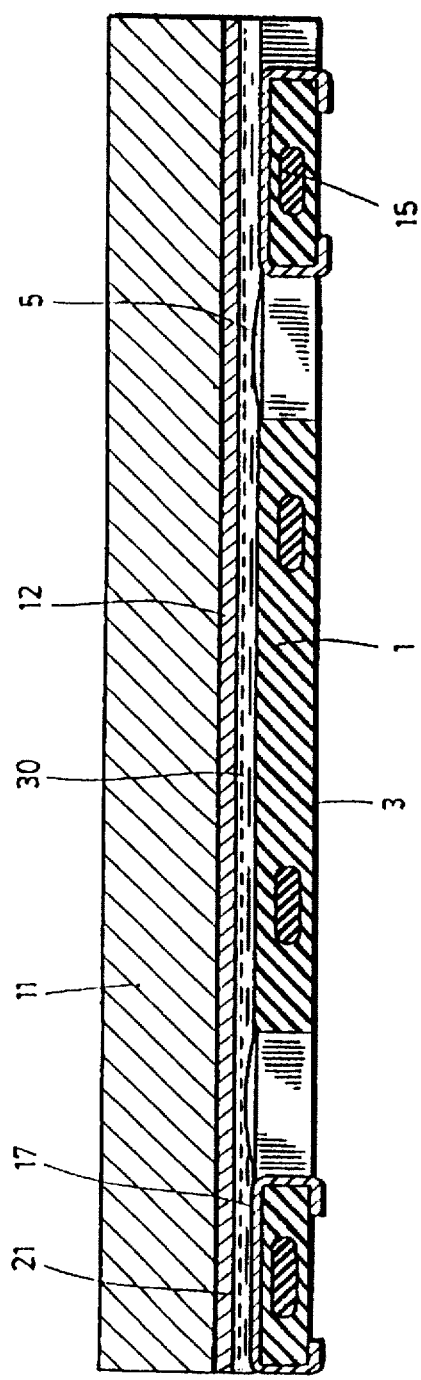
FIG. 3 is a fragmentary enlarged cross-sectional view of the track belt of FIG. 2 according to line III—III in FIG. 2 and further showing the cooperation between the track belt according the preferred embodiment of the invention and a portion of a slide rail provided with a sliding shoe.

Referring to FIGS. 1 to 3, there is illustrated a track belt "TB" provided with an improvement according to the invention. More particularly, with reference to FIG. 1, there is a track belt which comprises a body 1 made of an elastomeric material. This body 1 has an outer surface 3 for contact with the ground and an inner surface 5. The elastomeric material may be of any synthetic or natural suitable polymers. Of course the track belts are embodied according to techniques well known in the art and it is superfluous to describe these techniques.

The inner surface 5 is provided with means for engagement with driving means of the vehicle. Advantageously, those driving means may consist of driving wheels such as sprockets wheels. As shown on FIGS. 1 and 2, the means for engagement with driving means are advantageously driving lugs, each designated by the same reference number 7, substantially truncated pyramidal in shape and provided equally distributed in longitudinal endless rows 9.

The inner surface 5 presents at least one endless pathway having a sliding surface 13, and more preferably two pathways as shown on FIG. 1. As illustrated in FIG. 3, each of these sliding surfaces 13 is intended to be engaged by a corresponding slide rail 11 of a slide rail suspension of the track driven vehicle (e.g. snowmobile). The slide rail 11 is preferably provided, as illustrated in FIG. 3, with a sliding shoe 12 made of low friction material. This material is the one already used when manufacturing said slide suspension system. This material is usually a plastic material (e.g. ultra high molecular weight polyethylene). The underneath of the sliding rail 11 is thus preferably provided with a sliding shoe 12 cooperating with the sliding surface 13 of the track belt according to the preferred embodiment of the invention (see FIG. 3). Structural details by which the slide rails 11 are mechanically fastened to the remain of the suspension system have been voluntarily omitted in FIG. 3 for clarification purposes. Those characteristics are of course well known in the art and do not need any extensive description.

As shown on FIG. 1, rows 9 of driving lugs are extending in a parallel relationship with respect to the sliding surface 13. These driving lugs 7 are usually moulded within the track belt and made with the same elastomeric material. According to the preferred embodiment of the invention the inner surface 5 of the track belt is provided with six distinctive rows 9 (see FIG. 1). A rows 9 may be provided substantially on each side of the sliding surface 13 and the two remaining rows may advantageously provided on the area defined between the two sliding surfaces 13.

A plurality of reinforcing members 15, like metallic or plastic rods, are usually embedded within the elastomeric body 1. As shown in FIGS. 2 and 3 these members 15 are spaced apart from each other at constant interval and provided perpendicularly to the sliding surface 13. As usually known in the art, each driving lugs 7 are preferably provided in order to be positioned vis-a-vis a reinforcing member 15.

According to the invention, sliding surfaces 13 are provided with a plurality of slide clips 21.

As also well known in the art, said slide clips 21 are made in a suitable non-frictional metallic material, have a bearing surface 17 and are mounted on a corresponding portion of the body provided with reinforcing members 15. As shown on FIG. 2 slide clips 21 are commonly fastened to the track belt with two limbs 19 extending from two opposite sides of the bearing surface 17 and wrapped and fastened around the elastomeric material of the track belt body 1 surrounding a reinforcing member 15.

The clips 21 are spaced apart from each other by a segment 23 of said endless sliding surface 13. The clips 21 may be provided within the preferred frequency, which appears on FIGS. 2 and 3, of one slide clip every three reinforcing members 15. The segment 23 comprises a first part 25 made of elastomeric material and the remaining portions of the segment 23 comprise at least one hole or opening through the body. According to the invention the first part 25 of the segment 23 represents a sufficient size that frictions with the slide rail will generate a sufficient amount of heat to melt the snow and maintain a lubricating film of water. As illustrated on FIG. 2, the first part 25 preferably represents the greater portion of said segment 23. Contrary to the established opinions in the art this particular arrangement do not increase frictions between the track belt and the slide suspension. Friction is avoid thanks to a film of water 30. It is to be noted that the thickness of the film 30 has seen voluntarily exaggerated in FIG. 3 to make easier the comprehension of the Figure. This film 30 substantially results from the melting of the snow introduced trough hole(s) (i.e. parts 27 and 28) of the track belt. The friction existing between the track belt and the slide rail 11 generates a sufficient amount of heat to melt the snow contacting the slide rail 11 (or sliding shoe 12) to create a film of water on said rail 11 (or sliding shoe 12) and build a film of water between said slide rail 11 (or sliding shoe 12) and the corresponding first parts 25 of segments 23. Friction between the slide rail 11 (or sliding shoe 12) and corresponding first parts 25 are obtained when the track belt is running.

In the most preferred embodiment illustrated on FIGS. 1 to 3, the remaining area of the segment 23 consisting of a second and a third distinct parts, referred on FIGS. 1 to 3 with the number 27 and 28, and which defined two holes in the track belt body 1. Each of these holes are provided closely adjacent to an associated slide clip 21. This particular disposition of the holes 27 and 28 permits an easy fastening of the slide clips 21.

The invention also relates to a method for lubricating surfaces between a slide rail of a slide suspension system and a corresponding part of each segment of the inner surface of an endless track belt for vehicles moving on snow surfaces, said track belt being one of the type of the present invention. The method is characterized in that, while the track belt is running, there is snow introduced through cavities and contacting the slide rails against which it melts to define a film of water. As illustrated in FIG. 3, it then builds a lubricating film of water 30 between the slide rail 11 (or the sliding shoe 12) and the first part 25 of the rail. It is understood that frictions between the slide rail and the first part of the segments generate a sufficient amount of heat to melt said snow and maintain the presence of the film of water between said slide rail and first parts.

The present invention relates to all variations that may be considered obvious to a man skilled in the art.

The remaining configuration of the track is of conventional form as is the method for the manufacture of the track destined to motor driven vehicles.

The embodiments of the invention in which an exclusive property or privilege is claimed are defined as follows:

1. In an endless track belt for vehicles moving on snow surfaces, said track belt comprising:

a body made of an elastomeric material;

an outer surface for contact with the ground;

an inner surface provided with means for engagement with driving means and at least one endless pathway having a sliding surface contacting a corresponding slide rail of a slide rail suspension, said pathway being devoid from said means for engagment;

said endless sliding surface being provided with a plurality of slide clips that are spaced apart from each other by a segment of said endless sliding surface, said segment being divided in at least a first and a second distinct part, the first part being made of elastomeric material and the second part defining at least one cavity through the body;

the improvement wherein the cavity through the body is to allow the introduction of snow between the slide rail and the first part and wherein the first part is of such size that friction with the slide rail will generate heat in a sufficient amount to melt the snow and maintain a lubricating film of water therebetween.

2. An endless track belt according to claim 1, wherein the first part of the segment represents the greater portion of said segment.

3. An endless track belt according to claim 1, wherein the inner surface is provided with two endless pathways, each having a sliding surface and contacting a corresponding slide rail of the slide rail suspension.

4. An endless track belt according to claim 1, wherein said means for engagement with said driving means are driving lugs substantially truncated pyramidal in shape.

5. An endless track belt according to claim 1, wherein said means for engagement with driving means are provided in longitudinal and endless rows, said rows being extended in a parallel relationship with the sliding surface.

6. An endless track belt according to claim 5, wherein one of said rows is provided on each side of the sliding surface.

7. An endless track belt according to claim 1, wherein a plurality of reinforcing members are embedded within the elastomeric body, said members being spaced at a constant interval and provided perpendicularly to the endless pathway.

8. An endless track belt according to claim 7, wherein each of said means for engagement with driving means are positioned vis-à-vis a reinforcing member.

9. An endless track belt according to claim 7, wherein said slide clips are mounted on a corresponding portion of the body provided with a reinforcing member.

10. An endless track belt according to claim 8, wherein said slide clips are mounted on a corresponding portion of the body provided with a reinforcing member.

11. An endless track belt according to claim 10, wherein the slide clips are provided within the frequency of one slide clip every three means for engagement with driving means.

12. An endless track belt according to claim 9, wherein the slide clips are provided within the frequency of one slide clip every three reinforcing members.

13. An endless track belt according to claim 1 wherein said segment is divided in a first, a second and a third distinct part, the first part being made of elastomeric material and each of the second and the third parts defining one cavity, each of said cavities being provided adjacent to a corresponding slide clip.

14. In an endless track belt of the type comprising:

a body made of an elastomeric material;

an outer surface for contacting with the ground;

an inner surface provided with driving lugs for engagement with driving means and at least one endless pathway having a sliding surface contacting a corresponding slide rail of a slide rail suspension, said pathway being devoid from said means for engagment;

said driving lugs being truncated pyramidal in shape and provided equally spaced and in longitudinal and endless rows, said rows being extended in a parallel relationship with the sliding surface and one of said rows being provided on each side of the sliding surface;

a plurality of reinforcing members embedded within the elastomeric body, said members being spaced at constant interval and provided perpendicularly to the endless pathway;

each of said driving lugs being positioned vis-à-vis a reinforcing member;

said endless sliding surface being provided with a plurality of slide clips that are mounted on a corresponding portion of the body provided with a reinforcing member, within the frequency of one slide clip every three reinforcing member and spaced apart from each other by a segment of said endless sliding surface, said segment being divided in a first, a second and a third distinct part, the first part being made of elastomeric material and each of the second and the third parts defining two holes trough the body;

said holes being provided closely adjacent to an associated slide clip;

the improvement wherein the first part of the segment represents the greater portion of said segment, wherein the cavity through the body is to allow the introduction of snow between the slide rail and the first part and wherein the first part is of such size that friction with the slide rail will generate heat in a sufficient amount to melt the snow and maintain a lubricating film of water therebetween.

15. A method for lubricating surfaces between a slide rail of a slide suspension system and a corresponding part of each segment of the inner surface of an endless track belt for vehicles moving on snow surfaces, said track belt comprising:

a body made of an elastomeric material;

an outer surface for contact with the ground;

an inner surface provided with means for engagement with driving means and at least one endless pathway having a sliding surface contacting a corresponding slide rail of a slide rail suspension, said pathway being devoid from said means for engagment;

said endless sliding surface being provided with a plurality of slide clips that are spaced apart from each other by a segment of said endless sliding surface, said segment being divided in at least a first and a second distinct part, the first part being made of elastomeric material and the second part defining at least one cavity through the body, said cavity being to allow the introduction of snow between the slide rail and the first part and said first part being of such size that friction with the slide rail will generate heat to melt the snow and maintain a lubricating film of water therebetween;

wherein while the track belt is running, there is snow introduced through cavities and contacting the slide rails against which it melts to define a film of water and then builds a lubricating film of water between said slide rail and said first part of the rail, being understood that frictions between the slide rail and the first part of the segments generate a sufficient amount of heat to melt said snow and maintain the presence of the film of water between said slide rail and first parts.

* * * * *